United States Patent [19]

Shimazu et al.

[11] Patent Number: 5,911,928
[45] Date of Patent: Jun. 15, 1999

[54] METHOD FOR THE PRODUCTION OF POLYOLEFIN RESIN GRANULES

[75] Inventors: Hisao Shimazu, Hyogo; Kenichi Senda, Osaka; Hirofumi Sakaguchi, Nara, all of Japan; Ronald A. Smets, Bonheiden; Van Ravestyn Pierre, Geel, both of Belgium

[73] Assignees: Kanegafuchi Kagaku Kogyo Kabushiki Kaisha, Osaka, Japan; Kaneka Belgium N.N., Westerlo-Oevel, Belgium

[21] Appl. No.: 08/809,024

[22] PCT Filed: Sep. 19, 1995

[86] PCT No.: PCT/JP95/01865

§ 371 Date: Jun. 2, 1997

§ 102(e) Date: Jun. 2, 1997

[87] PCT Pub. No.: WO96/09150

PCT Pub. Date: Mar. 28, 1996

[30] Foreign Application Priority Data

Sep. 20, 1994 [JP] Japan ................................. 6-252938

[51] Int. Cl.⁶ .................................................. B29C 47/88
[52] U.S. Cl. .................... 264/53; 264/143; 264/178 R
[58] Field of Search .................... 264/141, 143, 264/178 R, 53, 54, 148

[56] References Cited

U.S. PATENT DOCUMENTS

| | | | |
|---|---|---|---|
| 3,046,606 | 7/1962 | Carter | 264/141 |
| 3,146,493 | 9/1964 | Steinle et al. | 264/141 |
| 3,792,950 | 2/1974 | Cuff | 425/378.1 |
| 3,920,783 | 11/1975 | Hara et al. | 264/141 |
| 4,123,207 | 10/1978 | Dudley | 425/67 |
| 4,737,547 | 4/1988 | White | 525/193 |
| 4,820,463 | 4/1989 | Raufast | 264/141 |
| 4,904,531 | 2/1990 | Kelley et al. | 428/404 |
| 5,607,700 | 3/1997 | Kando et al. | 264/178 R |

FOREIGN PATENT DOCUMENTS

| | | |
|---|---|---|
| 53-21897 | 7/1978 | Japan . |
| 59-221340 | 12/1984 | Japan . |
| 61-195808 | 8/1986 | Japan . |
| 1-110911 | 4/1989 | Japan . |
| 1-234212 | 9/1989 | Japan . |
| 3-76721 | 4/1991 | Japan . |
| 3-86504 | 4/1991 | Japan . |

*Primary Examiner*—Allan R. Kuhns
*Attorney, Agent, or Firm*—Armstrong, Westerman, Hattori, McLeland & Naughton

[57] ABSTRACT

A method for producing polyolefin resins granules are disclosed, which comprises extruding by using a homodirectional (co-rotating) twin-screw kneading extruder a polyolefin resin from a die nozzle having a diameter of less than 2 mm and a discharge amount per hole of 0.5–8 Kg/hr into warm water of 5–90° C. which is lower than a temperature of the resin by 140-220° C., and cutting the extrudate with a cutter blade in the warm water. According to this invention, uniformly dispersed compounds are obtained, and switching of a raw resin can be done speedily and economically, and further, resin granules of a desired shape can be produced.

3 Claims, No Drawings

METHOD FOR THE PRODUCTION OF POLYOLEFIN RESIN GRANULES

TECHNICAL FIELD

This invention relates to a method for the production of resin granules and pre-foamed beads for obtaining foamed articles in a mold from polyolefin resins, which are used in buffer packaging materials, goods-delivery boxes, heat insulating materials, core materials for car bumpers and the like.

BACKGROUND ART

When producing pre-foamed beads of polyolefin resins which are used for obtaining foamed articles in a mold from polyolefin resins, resin granules are pre-foamed without kneading and melting again, and therefore, a shape of the resin granule has a large influence on that of preformed beads. It happens sometimes that a large deformation occurs at the time of foaming. For this reason, resin granules are needed which have a small uniform shape, a constant or preferably small residual strain and which can become spherical after pre-foaming. Thus, raw resins are beforehand molded into small granules of a proper shape. As this molding method for resin granules, there are a strand cut method, under water cut method and the like.

In the case of the strand cut method, a residual strain is large at the time of foaming resin granules, and it's shape is largely deformed due to a big shrinkage in a direction of resin granule extrusion when pre-foamed beads are produced.

Therefore, in order to obtain the pre-foamed beads which have a small change in shape and a desired shape, the most proper conditions must be fulfilled exactly which are determined by seizing a relation between producing conditions or properties of raw resins and a ratio of shape change. However, it is practically difficult to fulfill these producing conditions stably and exactly and a yield is forced to be low. Moreover, there are some problems that a lot of works are needed even to a small change in raw materials, that a long space is necessary to set an equipment, and that productivity is comparatively low due to a limit for increasing strand numbers, and the like.

As the under water cut method, there are methods described, for example, in Unexamined Japanese Patent (JPA 61-195808) or Unexamined Japanese Patent (JPA 1-234212), the former discloses a method of producing a spherical granules of a thermoplastic resin which is characterized in that a resin temperature is adjusted so that a viscosity of a fused resin at a die entrance becomes between $1 \times 10^2$ and $5 \times 10^4$ poise and, further, an amount of discharge is adjusted to between 0.1 and 6.0 kg/hr when a fused resin is extruded into a cooling water from a nozzle of die which is attached at a tip of a molding machine and is granulated by being cut with a rotating cutter blade which is contacted with a die surface. These method are not necessarily sufficient because pre-foamed beads can not be obtained yet stably as large voids in the pre-foamed beads appear or a shape of the pre-foamed beads become non-spherical, though there are no large shrinkage in a direction of extrusion at the time of producing pre-formed beads as can be seen in a strand cut method. Thus, even though resin granules of a desired shape can be obtained at a glance, it happens sometimes that they cannot be used since large voids appear or their shape deforms largely when they were pre-foamed. In this case, losses of resin and time and labor for producing them become quite large since the fact that the resin granules are improper becomes clear long time after evaluating operations including a foaming operation which takes a long time succeeding to production of the resin granules. Further, since this tendency becomes remarkable as a discharge amount per one hole of a die nozzle increases, the application of this method to practical production scale is not necessarily satisfactory.

Pre-foamed beads are mixed if necessary, with compounding ingredients such as nucleating agents, anti-fusing agents, anti-static agents, pigments and the like. However, since the dispersion of these compounding ingredients is not necessarily sufficient due to small quantity of these compounding ingredients, properties of the obtained mixtures such as an uniformity in cell size and coloring, which is one of important factors for determining properties of a foamed article, are not always sufficient. Thus, a method is waited which can make a rapid progress in dispersibility of above-mentioned ingredients in the mixtures by a simple way.

Further, a single-screw extrusion is usually used. Recently, even in the case of a foamed article of polyolefin resins, a successive production of a variety of foamed articles, which are composed of plural resins or mixtures, is not unusual. Usually, these foamed articles are produced using the same equipment from a viewpoint of economical efficiency. However, when the single-screw extrusion is used, it is a weak point that productivity is quite low, since a good deal of time and labor are needed for switching of raw resins and a loss of raw materials is also large.

An object of this invention is to provide a producing method which makes it possible that the dispersion of compounding agents becomes uniform, that a switching of raw materials can be done smoothly and economically and further, that resin granules or pre-foamed beads of a desired shape can be produced by solving problems in the prior art as mentioned above.

The inventors have made a series of studies and finally have found a method which can solve the above-mentioned problems and have completed this invention by using a homodirectional (co-rotating) twin-screw kneading extruder as an extruder, extruding a resin by an under water cut method and adjusting a temperature of warm water in a proper range taking into consideration it's relation with a resin temperature etc., under conditions of a proper amount of discharge per one nozzle hole and a diameter of die nozzle which are determined by a desired shape of resin granules and an amount of production.

DISCLOSURE OF THE INVENTION

This invention provides, in a first aspect, a method for producing polyolefin resin granules which comprises the steps of: extruding by using a homodirectional twin screw kneading extruder a polyolefin resin from a die nozzle having a diameter of less than 2 mm and a discharge amount per hole of 2–8 Kg/hr into warm water of 5–90° C. which is lower than a temperature of the resin by 140–220° C., and cutting the extrudate with a cutter blade at a peripheral speed of 13–27 m/sec in the warm water, in a second aspect, a method for producing polyolefin pre-foamed beads which comprises pre-foaming the resin granules obtained by the above method.

BEST MODE FOR CARRYING OUT THE INVENTION

By using a homodirectional(co-rotating) twin-screw kneading extruder as an extruder, the both pending problems of dispersion and economy at the time of switching of a raw resin can be solved simultaneously. A small quantity of compounding agents is added to resin granules of a polyolefin resin, if necessary. For example, approximately 0.01% by weight (100 ppm) of talc is added usually as a nucleating agent to an ethylene-propylene random copolymer and this amount is adjusted properly according to a state of cells. In the prior art case where a single-screw extruder is used for granulating, it is difficult to obtain uniform cells since an amount of a nucleating agent is too small to get a good dispersion. Thus, even though a master batch method or a method of extruding resin granules twice is taken, a sufficient uniformity of cells cannot be fulfilled.

According to this invention, the uniformity of cells can be remarkably improved by taking use of the homodirectional twin-screw kneading extruder. Because of an improvement in dispersion of the other compounding agents, not only have properties of foamed articles in a mold been improved, but also economical effects such as omitting a blending step are obtained.

When resin granules of different resins or compounds are produced successively, it is generally impossible to conduct switching successively in a case of a single-screw extruder. That is, it is necessary to start again after an operation is stopped, a screw is detached and cleaned and a resin is switched. Not only this operation needs many operators, but also a shutdown time and an induction time to a stable operation become long. Further, a loss of a raw resin is large. On the other hand, since the homodirectional twin-screw kneading extruder has a self-cleaning effect, it is possible to conduct switching only by exchanging a resin to another resin in a continuous operation, and a loss of raw resins becomes small because raw resins are only lost in a short period for finishing a extrusion of a mixed resin. In the case where pre-foamed beads of different polyolefin resins are produced alternatively or pre-foamed beads of polyolefin resins from different resin compounds are produced alternatively, this effect is necessary and essential.

An amount of discharge per one nozzle hole is set by stability of extrusion, a desired amount of production and the like. Though depending on a viscosity of resin or a shape of die, it becomes impossible to obtain resin granules of a desired shape due to an unsteady fluidity of a fused resin if an amount of discharge per one nozzle hole is over 8 kg/hr. Further, though depending on the ability of an extruder, above 2 kg/hr is preferable by taking account of the practical production scale and stability of an extruder. A diameter of a die nozzle is set by taking account of a die swell in order to obtain resin granules of a desired shape. Generally speaking, a resin granule required for obtaining a pre-foamed bead of a desired size is controlled by weight per one granule and a preferable weight of a resin granule is less than 15 mg/one granule, more preferably less than 5 mg/one granule and the most preferable less than 2 mg/one granule. Thus, the diameter of a die nozzle is set at less than 2 mm. Here, a diameter of die nozzle means a diameter at the tip of a land of die nozzle.

A shape of a resin granule is not limited if a sphere-like shape suitable for use in molded articles can be obtained after being pre-foamed. However, even if resin granules are spherical, useless pre-foamed beads for use in molded articles may be resulted due to a large deformation after being pre-foamed if a temperature of a warm water-itself or a relation between a temperature of a warm water and that of resin is improper. While, if these conditions are fulfilled, an almost spherical and useful pre-foamed beads can be obtained after being foamed, even if a shape of resin granules is somewhat flat. A setting of a warm water temperature is the most important to get resin granules of a desired shape. In the case where resin granules of a general purpose which is not supplied to foaming materials, a temperature of warm water is generally set between 20–50° C.

However, even though a resin is extruded at the same resin temperature and resin granules of a normal shape can be obtained in appearance, it happens sometimes that pre-foamed beads of large voids, are mixed into normal pre-foamed ones after being pre-foamed and, therefore, they are intolerable to a practical use. Further, since it becomes clear after pre-foaming that pre-foamed beads of a useless shape has been obtained though a shape of resin granules looks like a desired form, it takes a long time for evaluating and it often happens that a lot of resin granules are lost. This invention has solved this problem by keeping a temperature of warm water itself in a special range and further controlling it according to a resin temperature.

That is, the problem mentioned above has been solved by keeping a temperature of warm water in the range between 5–90° C. and 140–220°C. lower than a resin temperature. If the temperature of warm water is over 90° C., it is not proper since resin granules are fused each other. If the temperature of warm water is less than 5° C., it is not proper since clogging of a die nozzle tends to happen. Even if the temperature of warm water itself is in the above-mentioned range, it may happen sometimes that resin granules are fused each other, when the temperature of warm water is lower than that of resin by less than 140° C. This is due to insufficient cooling of the resin granules since the difference of the temperatures between warm water and resin is small. Moreover, it is not preferable that the temperature of warm water is lower than that of resin by more than 220° C., since cavities occur in resin granules or large voids are generated in pre-foaming beads after pre-foaming even if the resin granules have a normal shape in appearance. The reason why such phenomenon occurs is not clear, but may be guessed as follows. That is, when a resin is extruded from a die nozzle, a tip and sides of extrudate may be cooled abruptly and its length may be fixed if the temperature difference between warm water and the resin is large. Next, the inside of the extrudate is cooled slowly and a volume shrinkage may happen due to crystallization. However, the tip and the sides whose surfaces are fixed do not deform. Thus, only a back edge where cooling has not proceeded yet deforms and is pulled into the inside to, thus result in a cavity. Such deformation may be further expanded by pre-foaming. Therefore, even if a cavity is too small to be detected in resin granules, this cavity may be grown large remarkably to a void after pre-foaming.

It is also preferable that a peripheral speed of a cutter blade is set high. Besides the temperature of warm water being set in the above- mentioned range, the peripheral speed of the cutter blade is set preferably to not less than 13 m/sec, more preferably to not less than 15 m/sec. If the peripheral speed is below 13 m/sec, it may happen that a shape of resin granules becomes undesirable and irregular. And further, if the peripheral speed is below 13 m/sec, it may happen sometimes that the resin granules are fused each other. Here, a peripheral speed of a cutter blade means the same at the tip of a die nozzle. Also, it may happen that resin granules deform undesirably into an irregular form. The reason why this happens is not clear, but it may be guessed that this is due to a residual strain when the extrudate is cut. As in the case of setting a temperature of warm water, a large amount of resin granules were lost due to a long evaluation time since it becomes clear that pre-foamed beads of an improper shape was obtained only after pre-foaming, but this problem is solved by setting the peripheral speed above 13 m/sec. However, in the case where the peripheral speed is too large, many troubles such as a breakage of the cutter blade occur, and thus, it is preferable that the peripheral speed is below 27 m/sec.

The polyolefin resin used in this invention includes, for example, low density polyethylene, middle density polyethylene, high density polyethylene, linear low density polyethylene, polypropylene, ethylene-propylene copolymers, propylene-butene copolymers, ethylene-butene-propylene terpolymers, ethylene-vinyl acetate copolymers and poly(butene-1), though not limited thereto. These are used individually or in combination of two or more. Further, it is needless to say that compounding ingredients such as anti-fusing agents, nucleating agents, anti-static agents, pigments and the like can be added properly, if necessary. This invention is quite suitable for mixing a very small amount of compounding ingredients or to produce pre-foamed beads which are composed of different polyolefin resins or different resin compounds using a single equipment for resin granules, since this invention employs a homodirectional twin-screw kneading extruder.

Pre-foamed beads in this invention are obtained by foaming above-mentioned resin granules approximately 5–60 times using known methods described below.

(1) a method of charging olefin resin granules, a volatile foaming agent and a dispersion agent, if necessary, into a pressure vessel, heating the mixture to the neighborhood of a melting temperature of said resin to thus pressurize with agitating, then releasing said resin granules and an aqueous solution into a low pressure region (atmospheric pressure) by opening a valve set at the bottom of the pressure vessel.

(2) a method of impregnating olefin resin granules with a volatile foaming agent, charging the obtained granules into a pressure vessel, introducing steam etc. from one end of the pressure vessel with agitation, together with a small amount of an anti-fusing agent added, if necessary, to thus foam said resin granules, then taking out the pre-foamed beads.

The invention will be described in more detail with reference to the following examples, which are in no way intended to restrict the scope of the invention.

EXAMPLE 1

Resin granules were produced by extruding a fused compound (which was composed of 100 parts by weight of an ethylene-propylene random copolymer, 0.01 part by weight of talc as a nucleating agent and the other compounding agents) from a die nozzle attached to a tip of an extruder (number of nozzles: 96; nozzle diameter: 1.0 mm) into 75° C. warm water with a discharge amount of 3.6 kg/hr per one nozzle hole, cutting the extrudate with a cutter blade (number of blades: 12) provided near die at a peripheral speed of 19 m/sec and separating the resin granules obtained from circulating warm water. The temperature of the resin was, in this case, 270° C. according to a thermometer attached to this extruder.

Further, die nozzles were arranged circumferentially where the distance between two nozzles facing each other over the center was 120 mm, a rotating number of the cutter blade were 300 rpm and a discharged amount of resin was 350 kg/hr. The shape of the obtained resin granules and the weight of one granule were evaluated and the results evaluated were shown in Table 1.

EXAMPLES 2–8 AND COMPARATIVE EXAMPLES 1~8

Resin granules were produced in the same way as in Example 1 except that the number of nozzles was chosen from 60–250, the rotating number of the cutter blade was chosen from 1500–4300 rpm, the number of blades was chosen from 8–12 properly and that the diameter of the die nozzle, the discharge amount per one nozzle hole, the temperature of the warm water, the temperature of the resin and the peripheral speed of the cutter blade were changed as shown in Table 1. Here, the discharge amount of the resin was 100~500 kg/hr. The results were shown in Table 1.

TABLE 1

| | Diameter of die nozzle (mm) | Discharge amount of resin kg/hr · hole | Temp. of resin (° C.) | Temp. of warm water (° C.) | Resin temp. - warm water temp. (° C.) | Peripheral speed m/sec | Weight of one granule mg/granule | Evaluation of shape | References |
|---|---|---|---|---|---|---|---|---|---|
| Examples | | | | | | | | | |
| 1 | 1.0 | 3.6 | 270 | 75 | 195 | 19 | 1.67 | ○ | |
| 2 | 1.5 | 8.0 | 270 | 75 | 195 | 13 | 8.31 | ○ | |
| 3 | 0.8 | 5.0 | 270 | 75 | 195 | 27 | 1.62 | ○ | |
| 4 | 0.8 | 3.6 | 270 | 50 | 220 | 19 | 1.67 | ○ | |
| 5 | 0.8 | 3.6 | 270 | 60 | 210 | 19 | 1.67 | ○ | |
| 6 | 0.8 | 3.6 | 270 | 80 | 190 | 19 | 1.67 | ○ | |
| 7 | 0.8 | 3.6 | 230 | 30 | 200 | 19 | 1.67 | ○ | |
| 8 | 0.8 | 3.6 | 230 | 80 | 150 | 19 | 1.67 | ○ | |
| Comparative Examples | | | | | | | | | |
| 1 | 0.8 | 3.6 | 270 | 30 | 240 | 19 | 1.67 | Δ | Cavity |
| 2 | 0.8 | 3.6 | 270 | 95 | 175 | 19 | **** | X | Fusion of granules |
| 3 | 0.8 | 3.6 | 210 | 80 | 130 | 19 | **** | X | Fusion of granules |
| 4 | 0.8 | 3.6 | 220 | 2 | 218 | 19 | **** | X | Clogging of nozzle |
| 5 | 1.1 | 12.0 | 270 | 75 | 195 | 27 | **** | X | Unstable extrusion |
| 6 | 0.5 | 0.3 | 270 | 75 | 195 | 10 | **** | X | Unstable extrusion |
| 7 | 0.5 | 0.5 | 270 | 75 | 195 | 10 | 0.52 | Δ | A bit flat |
| 8 | 2.5 | 8.0 | 270 | 75 | 195 | 10 | 13.96 | X | Remarkably flat |

Note 1) ****: No measurable granules were obtained.
Note 2) Evaluation of shape.
  ○:Almost spherical shape.
  Δ:Deviated a bit from the spherical shape but there is a possibility that a spherical shape may be obtained after foaming.

x: Non-spherical shape and there is no possibility that a spherical shape may be obtained after foaming.

EXAMPLE 9

After producing resin granules of a compound comprising a linear low density polyethylene (compound 1) in the same way as in Example 1, resin granules of a compound (compound 2) was produced by mixing the compound 1 with carbon black successively. It was confirmed that the compound 1 was exchanged with the compound 2 completely after 20 minutes, judging from the color of the resin granules.

COMPARATIVE EXAMPLE 9

Resin granules comprising the compound 1 used in Example 9 was produced by attaching an under water cut equipment to a 115 mm Φ single screw extruder. According to an usual method which was used when a raw material was exchanged in the single screw extruder, namely, first a screw was detached after an operation was stopped, and it was again attached to the extruder after being cleaned. Afterwards, resin granules comprising the compound 2 was produced. It took about 8 hours until a stable production was reached after stopping the production of the resin granules comprising the compound 1.

EXAMPLES 10~17 AND COMPARATIVE EXAMPLES 10~12

100 parts by weight of the resin granules obtained in Example 1–8, and Comparative Examples 1, 7 and 8, 5–10 parts by weight of isobutane as a volatile foaming agent, 2 parts by weight of powdered basic tricalcium phosphate, 0.03 part by weight of sodium n-paraffin sulfonate and 300 parts by weight of water were put into a pressure vessel, and the temperature was adjusted in a range of 140–148° C. according to a desired foaming ratio, and, further, the inner pressure was adjusted to between 15–22 kg/cm² by injecting isobutane. Thereafter, while keeping the temperature and pressure constant by injecting isobutane, pre-foamed beads were obtained by releasing the aqueous dispersion through an orifice into atmospheric pressure by opening a valve provided at the bottom of the pressure vessel. The foaming ratio and the shape of the obtained pre-foamed beads were evaluated. Further, an uniformity of the cell diameter was evaluated by observing a cross-section of the pre-foamed beads with a microscope. The results were shown in Table 2.

Comparative Example 13

Almost spherical resin granules of 1.67 mg per one resin granule were produced with use of the resin granules comprising the compound produced in Example 1 by using the equipment used in Comparative Example 9. These resin granules were pre-foamed in the same method as used in Example 10 and were evaluated in the same way as in Comparative Examples 10 and 12. The results were shown in Table 2.

TABLE 2

|  | Resin granules used | Foaming ratio of pre-formed beads | Uniformity of cell | Evaluation of shape | Reference |
| --- | --- | --- | --- | --- | --- |
| Examples |  |  |  |  |  |
| 10 | Example 1 | 35 | ○ | ○ |  |
| 11 | Example 2 | 55 | ○ | ○ |  |
| 12 | Example 3 | 7 | ○ | ○ |  |
| 13 | Example 4 | 25 | ○ | ○ |  |
| 14 | Example 5 | 25 | ○ | ○ |  |
| 15 | Example 6 | 25 | ○ | ○ |  |
| 16 | Example 7 | 25 | ○ | ○ |  |
| 17 | Example 8 | 25 | ○ | ○ |  |
| Comparative Examples |  |  |  |  |  |
| 10 | Comparative Example 1 | 25 | ○ | X | Large void |
| 11 | Comparative Example 7 | 25 | ○ | ○ | Shape became better after pre-foaming |
| 12 | Comparative Example 8 | 25 | ○ | X | Extremely flat |
| 13 | Comparative Example 13 | 25 | X | ○ |  |

INDUSTRIAL APPLICABILITY

According to this invention, compounding ingredients are uniformly dispersed in polyolefin resin pre-foamed beads by the use of a homodirectional twin-screw kneading extruder. Moreover, the switching of a raw resin is conducted rapidly and economically when the polyolefin resin pre-foamed beads are produced from different resins or different resin compounds by the use of the same equipment.

In addition, in this invention, an under water cut method is employed, and a discharge amount per nozzle hole and a diameter of a die nozzle are not only specified, but also a temperature of warm water itself and the relationship between this temperature and a temperature of a resin are specified. By the specific combination of these elements, polyolefin resin granules of a desired shape are provided, and pre-foamed beads thereof having a desired shape without being deformed at the time of pre-foaming are provided efficiently and in a practical production scale.

What is claimed is:

1. A method for producing polyolefin granules which comprises the steps of:

extruding by using a homodirectional twin-screw kneading extruder a melted polyolefin resin from at least one die nozzle into water having a temperature in the range of 5–90° C., wherein the water temperature is lower than the temperature of the melted resin by 140–220° C. and wherein said die nozzle is provided with an exit hole having a diameter of less than 2 mm and the resin discharge amount per exit hole is 2–8 Kg/hr, and cutting the extrudate with a rotating cutter blade at a peripheral speed of 13–27 m/sec in the water.

2. A method as claimed in claim 1, wherein the polyolefin resin contains talc as a nucleating agent.

3. A method for producing polyolefin pre-foamed beads, which comprises pre-foaming the resin granules obtained in claim 1 or 2.

* * * * *